(12) United States Patent
Sekar et al.

(10) Patent No.: US 8,019,900 B1
(45) Date of Patent: Sep. 13, 2011

(54) OPPORTUNISTIC PEER-TO-PEER SYNCHRONIZATION IN A SYNCHRONIZATION SYSTEM

(75) Inventors: Kiren R. Sekar, San Francisco, CA (US); Jack B. Strong, Sunnyvale, CA (US)

(73) Assignee: SugarSync, Inc., San Mateo, CA (US)

(*) Notice: Subject to any disclaimer, the term of this patent is extended or adjusted under 35 U.S.C. 154(b) by 44 days.

(21) Appl. No.: 12/383,387

(22) Filed: Mar. 24, 2009

Related U.S. Application Data

(60) Provisional application No. 61/070,853, filed on Mar. 25, 2008.

(51) Int. Cl.
*G06F 15/16* (2006.01)

(52) U.S. Cl. ................... 709/248; 709/217; 709/224

(58) Field of Classification Search .......... 709/200–203, 709/217–227, 248; 707/610–620, 656, 658
See application file for complete search history.

(56) References Cited

U.S. PATENT DOCUMENTS

| | | | |
|---|---|---|---|
| 5,862,346 A | 1/1999 | Kley et al. | |
| 6,348,932 B1 | 2/2002 | Nishikawa et al. | |
| 6,407,750 B1 | 6/2002 | Gioscia et al. | |
| 6,636,888 B1 | 10/2003 | Bookspan et al. | |
| 6,904,185 B1 | 6/2005 | Wilkins et al. | |
| 7,039,723 B2 | 5/2006 | Hu et al. | |
| 7,103,357 B2 | 9/2006 | Kirani et al. | |
| 7,139,555 B2 * | 11/2006 | Apfel ........................ 455/412.2 | |
| 7,319,536 B1 | 1/2008 | Wilkins et al. | |
| 7,321,919 B2 | 1/2008 | Jacobs et al. | |
| 7,369,161 B2 | 5/2008 | Easwar et al. | |
| 7,372,485 B1 | 5/2008 | Bodnar et al. | |
| 7,441,180 B1 | 10/2008 | Kaczmarek et al. | |
| 7,502,795 B1 | 3/2009 | Svendsen et al. | |
| 7,576,752 B1 | 8/2009 | Benson et al. | |
| 7,680,067 B2 * | 3/2010 | Prasad et al. ................... 370/254 |
| 7,707,500 B2 | 4/2010 | Martinez | |
| 7,747,596 B2 | 6/2010 | Bigioi et al. | |
| 7,809,682 B2 * | 10/2010 | Paterson et al. ................ 707/625 |
| 2002/0044159 A1 | 4/2002 | Kuroiwa et al. | |
| 2002/0065848 A1 | 5/2002 | Walker et al. | |
| 2002/0066050 A1 | 5/2002 | Lerman et al. | |
| 2002/0099772 A1 * | 7/2002 | Deshpande et al. .......... 709/204 |
| 2002/0129096 A1 | 9/2002 | Mansour et al. | |
| 2003/0004952 A1 | 1/2003 | Nixon et al. | |
| 2003/0218633 A1 | 11/2003 | Mikhail et al. | |
| 2004/0044732 A1 | 3/2004 | Fushiki et al. | |
| 2004/0088420 A1 | 5/2004 | Allen et al. | |
| 2004/0148207 A1 | 7/2004 | Smith et al. | |
| 2004/0148375 A1 | 7/2004 | Levett et al. | |
| 2005/0044164 A1 | 2/2005 | O'Farrell et al. | |
| 2005/0165869 A1 * | 7/2005 | Huang et al. ................... 707/204 |
| 2006/0052091 A1 | 3/2006 | Onyon et al. | |
| 2006/0242206 A1 * | 10/2006 | Brezak et al. ................. 707/201 |

(Continued)

*Primary Examiner* — Moustafa M Meky
(74) *Attorney, Agent, or Firm* — Tina M. Lessani; Lessani & Lessani LLP (57) ABSTRACT

The present invention provides an opportunistic peer-to-peer synchronization method, where client devices can either synchronize with a peer device or a master server, depending on which is the best available option. Client devices monitor synchronization information provided by peer client devices to determine if data that the client device desires to synchronize can be synchronized with a peer client device. If a peer device is available for synchronization, then a client device will synchronize with such peer device. Otherwise, the client device will synchronize with the master server or other device. Client devices can seamlessly switch between peer-to-peer synchronization and client-server synchronization, even during the middle of synchronization session.

24 Claims, 5 Drawing Sheets

U.S. PATENT DOCUMENTS

| | | |
|---|---|---|
| 2007/0043830 A1 | 2/2007 | Housenbold et al. |
| 2007/0156434 A1 | 7/2007 | Martin et al. |
| 2007/0179989 A1* | 8/2007 | Maes .................... 707/201 |
| 2007/0250645 A1* | 10/2007 | Meadows et al. ............. 709/248 |
| 2007/0276836 A1* | 11/2007 | Chatterjee et al. ............. 707/10 |
| 2008/0109448 A1 | 5/2008 | Aboel-Nil et al. |
| 2008/0126936 A1 | 5/2008 | Williams |
| 2008/0168185 A1 | 7/2008 | Robbin et al. |
| 2009/0183060 A1 | 7/2009 | Heller et al. |
| 2009/0187609 A1* | 7/2009 | Barton et al. ................. 707/202 |

* cited by examiner

OPPORTUNISTIC PEER-TO-PEER SYNCHRONIZATION IN A SYNCHRONIZATION SYSTEM

RELATED APPLICATIONS

This application claims the benefit of U.S. Provisional Application No. 61/070,853 filed on Mar. 25, 2008 with inventors Kiren Sekar and Jack B. Stong and titled "Opportunistic Peer-to-Peer Synchronization in a Synchronization System," the contents of which are incorporated by reference as if fully disclosed herein

BACKGROUND OF THE INVENTION

1. Field of the Invention

This invention relates generally to synchronization/backup server systems, and more, specifically, to a method for peer-to-peer synchronization.

2. Description of the Background Art

Synchronization systems enable users to synchronize data across a plurality of devices. Typical TCP/IP-based synchronization solutions run in one of two modes: client server, or peer-to-peer. Examples of client-server synchronization solutions include MICROSOFT EXCHANGE (email/PIM) and SHARPCAST SUGARSYNC. Examples of peer-to-peer solutions include Microsoft's WINDOWS LIVE FOLDERSHARE, and utilities such as Rsync.

Client-server solutions offer several benefits, such as providing data synchronization between devices even if the devices cannot reach each other (e.g., because they are behind separate firewalls, or because one is not turned on or connected to a network). Additionally, they can offer more robust backup capabilities, as data is synced to a central server, often in a highly available datacenter. One of the disadvantages of a client-server solution is that synchronizing large amounts of data via the Internet can be slow and expensive compared to transfers on a local area network or intranet.

Peer-to-peer solutions offer much faster data transfers when peers are on the same local area network. Typical data transfer speeds on local area networks can reach one gigabit per second, whereas typical connections over the Internet are limited to several megabits per second. By transferring data between peers over a local network, instead of between a client and a central server over the Internet, client devices can synchronize much more quickly. One of the disadvantages of peer-to-peer solutions is that devices can only be synchronized when they are both running and able to communication via the same local network or intranet.

As indicated above, each method has its advantages and disadvantages. It would be desirable to have a synchronization system that was able to take advantage of the best of both peer-to-peer synchronization and client-server synchronization.

SUMMARY

The present invention provides an opportunistic peer-to-peer synchronization method, where client devices can either synchronize with a peer device or a master server, depending on which is the best available option. Typically, two devices are "peers" if they are connected to each other via a local area network or intranet. Synchronizing with a peer over a local area network or intranet is usually faster and cheaper than synchronizing over an Internet connection. If a peer device is available for synchronization, then a client device will synchronize with such peer device. Otherwise, the client device will synchronize with the master server or other device.

In one embodiment, client devices advertise domains they have available for synchronization to their peers on a local network (or other network that is faster or cheaper than the network connection with the central sync server). If a client device (the "requesting device") desires to synchronize with a particular domain, it determines whether or not any peers on its local network are advertising the domain.

If no peers are advertising the domain, the requesting device attempts to synchronize the domain from another source. In one embodiment, if the requesting device is online, it will synchronize the domain with the master server.

If a peer is advertising the domain, the requesting device sends a request to the advertising peer to establish a synchronization session. The request includes the applicable user ID or account information of the user associated with the requesting device. The advertising peer device attempts to verify the identity of the user logged into or otherwise associated with the requesting device.

If the peer device is unable to verify the identity of the user and validate the request, it rejects the synchronization request. If the peer device is able to verify the identity of the user and validate the request (i.e., determine that the request is authorized), then the peer device established a synchronization session with the requesting device.

While the synchronization session is established, the peer device and the requesting device synchronize metadata for the domain. During a synchronization session, the peer and requesting devices can synchronize files and data objects corresponding to the synchronized metadata. The peer and requesting devices may send copies of files and data objects either with the metadata or "on demand" (i.e., when requested by the user).

Client devices can seamlessly switch between peer-to-peer synchronization and client-server synchronization, even during the middle of synchronization session. For example, if a client device has established a synchronization session with a peer and such synchronization session is terminated, the client device, if online, can automatically switch to synchronizing with a master server or other device. Also, if a client device has established a synchronization session with the master server, the client device can switch to synchronizing one or more domains with one or more peers if such peer(s) become available for synchronization.

DETAILED DESCRIPTION OF THE PREFERRED EMBODIMENTS

Figure 1:
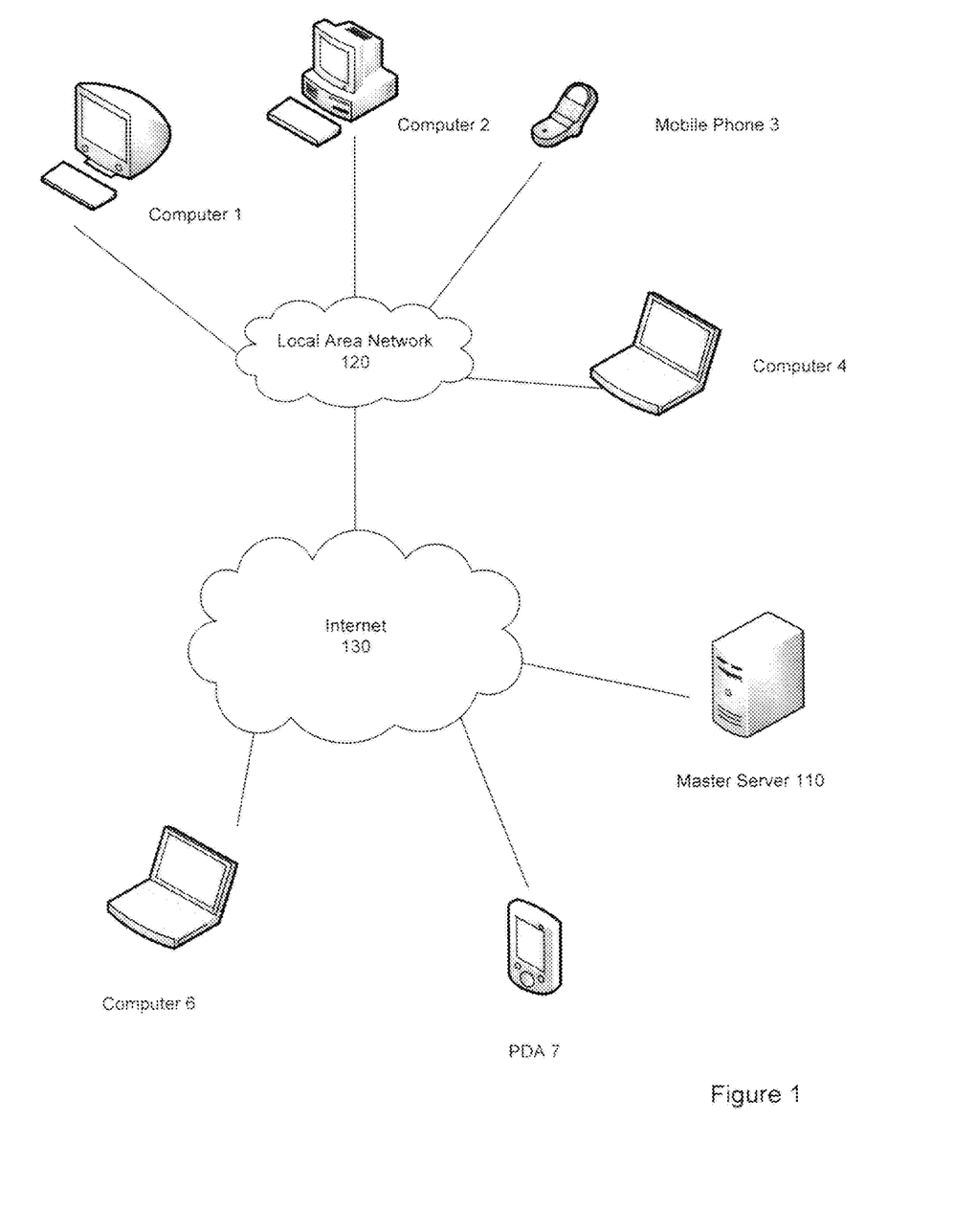
FIG. 1 is a block diagram that illustrates an example of a synchronization system.

FIG. 1 illustrates an example of a synchronization system. In the system in FIG. 1, client devices 1-7 can synchronize data with a master server 110. Computer 1, computer 2, mobile phone 3 and set-top box 4 are connected to each other over a local area network 120. These devices 1-4 also are connected to the master server via the Internet 130. PDA 7 and computer 6 are connected to master server 110 via the Internet 130. Other examples of client devices include (but are not limited to) network appliances, set-top boxes, and network-accessible storage devices.

In one embodiment, client devices 1-7 synchronize data with master server 110 by each establishing a dedicated connection with master server 110, where a client device uses its dedicated connection to inform the master server 110 in real time of any changes to synchronized data on that device. If the data changed is data that is synchronized with other client devices, then master server 110 uses its dedicated connection with client devices to notify such other client devices of the change. For example, if a user is synchronizing photos on his phone with photos on his home computer and if the user takes a picture on his mobile phone, the phone can automatically upload such picture to the master server which will automatically download it to the user's computer when the user's computer has a connection with the master server. The master server also can store a back up copy of synchronized data and provide a web interface through which the user can access backed up data on the server.

One example of a synchronization system is described in disclosed in U.S. patent application Ser. No. 11/269,498 titled "Method and Apparatus for a File Sharing and Synchronization System," and filed on Nov. 8, 2005 with first-named inventor Jack B. Strong, the contents of which are incorporated by reference as if fully disclosed herein. Another example is disclosed in U.S. patent application Ser. No. 12/077,533 titled "Method for Displaying Files from a Plurality of Devices in a Multi-View Interface and for Enabling Operations to be Performed on such Files through such Interface," and filed on Mar. 19, 2008 with inventors Vivek Patel, Mark C. Dixon, Gibu Thomas, Ashish Chordia, and Nichole C. Gabriel, the contents of which are incorporated by reference as if fully disclosed herein.

The present invention provides an opportunistic peer-to-peer synchronization method, where client devices can either synchronize with a peer device or a master server, depending on which is the best available option. Typically, two devices are "peers" if they are connected to each other via a local area network or intranet. Synchronizing with a peer over a local area network or intranet is usually faster and cheaper than synchronizing over an Internet connection. If a peer device is available for synchronization, then a client device will synchronize with such peer device. Otherwise, the client device will synchronize with the master server or other device.

Figure 2A:
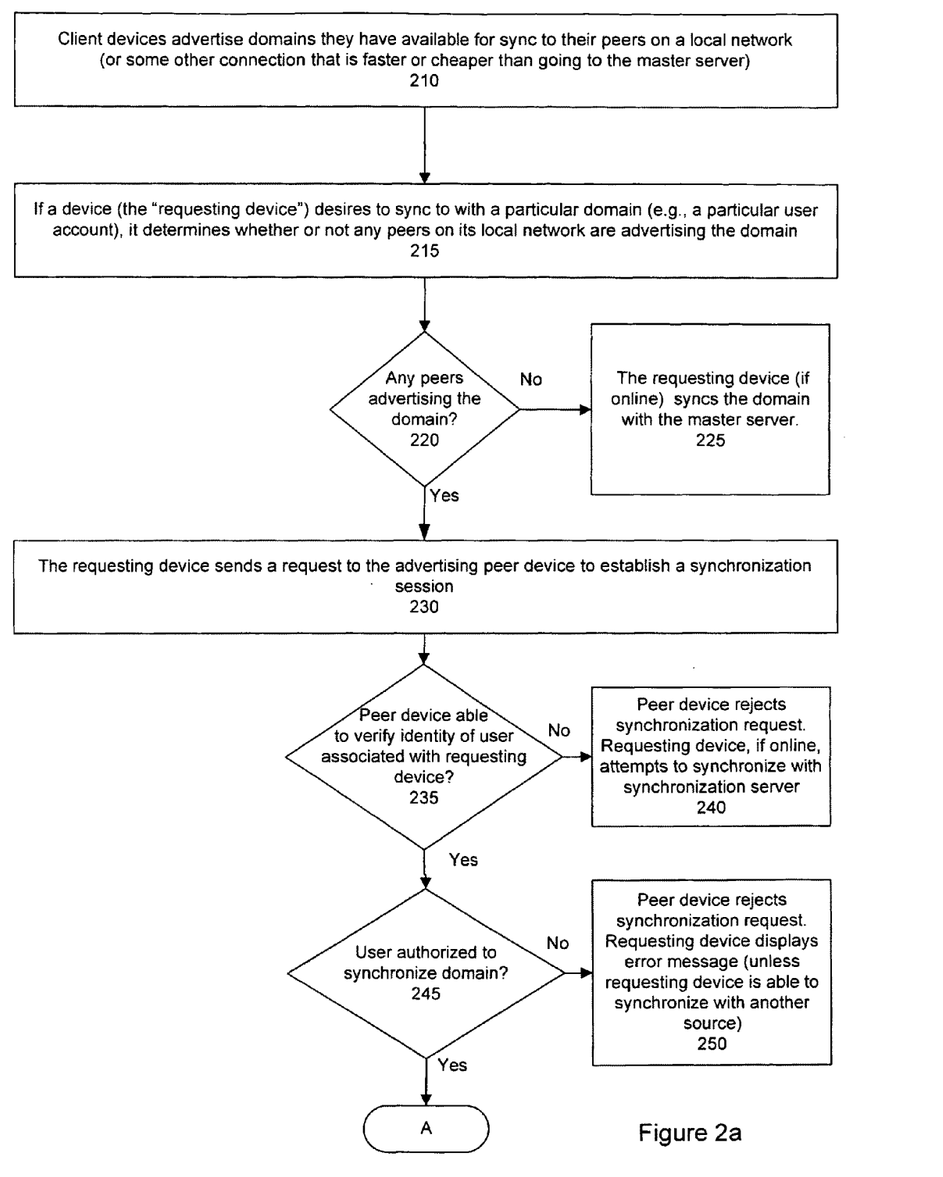
FIGS. 2a-2b illustrate a method for opportunistic peer-to-peer synchronization according to one embodiment of the present invention.
Figure 2B:
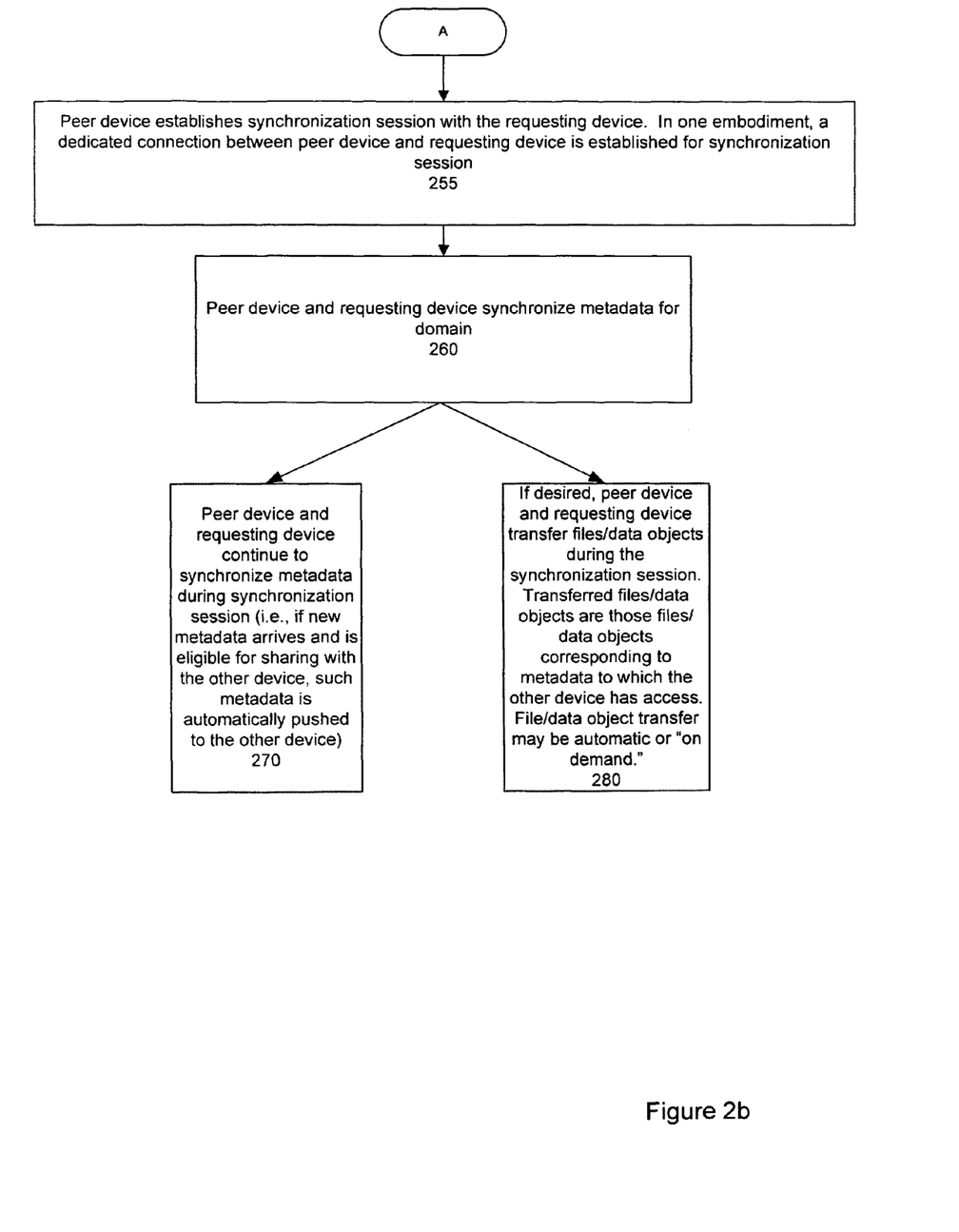

FIG. 2 illustrates an opportunistic peer-to-peer synchronization method according to one embodiment of the present invention. In such method, client devices advertise domains they have available for synchronization to their peers on a local network (or other network that is faster or cheaper than the network connection with the central sync server) (step 210). If a client device (the "requesting device") desires to synchronize with a particular domain, it determines whether or not any peers on its local network are advertising the domain (step 215). A domain can be (but is not limited to) a particular user account.

If no peers are advertising the domain, the requesting device attempts to synchronize the domain from another source (step 225). In one embodiment, if the requesting device is online, it will synchronize the domain with the master server.

If a peer is advertising the domain, the requesting device sends a request to the advertising peer to establish a synchronization session (step 230). The request includes the applicable user ID or account information of the user associated with the requesting device. The advertising peer device attempts to verify the identity of the user logged into or otherwise associated with the requesting device (step 235).

If the peer device is unable to verify the identity of the user, it rejects the synchronization request (step 240), and the requesting device may attempt to synchronize with the master synchronization server or another source. If the peer device is able to verify the identity of the user, the peer device then determines if the user is authorized to synchronize the domain with the peer (step 245). If not, the peer device rejects the synchronization request, and the requesting device displays an error message to the user, unless the requesting device is able to synchronize the domain with the master synchronization server or another source (step 250).

If the peer device is able to verify the identity of the user and if the user is authorized to synchronize the domain, then the peer device established a synchronization session with the requesting device (step 255). In one embodiment, a dedicated connection between the peer device and the requesting device is established for a synchronization session.

While the synchronization session is established, the peer device and the requesting device synchronize metadata for the domain (step 260). Specifically, the peer and requesting devices exchange information about what metadata they each have and the peer device sends the requesting device any metadata that the requesting device is authorized to receive but has not yet received. If the synchronization is two-way, the requesting device may also sends the peer device any metadata the peer is authorized to receive but has not yet received. If new metadata arrives at the peer device or the requesting device and is eligible for sharing with the other device, such metadata is automatically pushed to the other device during the synchronization session (step 270).

During a synchronization session, the peer and requesting devices can synchronize files and data objects corresponding to the synchronized metadata (step 280). The peer and requesting devices may send copies of files and data objects either with the metadata or "on demand" (i.e., when requested by the user).

As indicated in steps 235-250 above, when a client device receives the synchronization request from a peer client device (referred to as the requesting device), the receiving peer device must verify that the requesting device has the appropriate permission to receive the desired resource. In one embodiment, this process occurs via two steps. First, client devices who wish to serve resources to peers synchronize with the central server all public key of all the users that they wish to serve. These keys are kept in sync with the master server, and, thus, are available for offline use. If a client device receives a synchronization request from a peer device, then the client device uses standard public key encryption techniques to verify the identity of the user logged into or otherwise associated with the requesting peer device. Once the identity of the user is verified, the client device checks an access control table on the client device to determine whether or not such user is allowed to retrieve the requested resource. Each client device synchronizes its access control table with the synchronization server, and, consequently, each client device has the same access permissions from a peer device as they do from the master server.

Because the access control table is a synchronized resource, it may be modified on client devices or the master server, and the changes on one will propagate to the other. Consider, for instance, two users with PCs on the same local network. Suppose that such network is not connected to the Internet, and, therefore, is not connected to the master server. If user A on computer A wishes to grant access for a resource to user B on computer B, and user A had previously synced user B's public keys from the server (for identification verification), user A can update the local copy of her access control table to give B permission to access the resource. Now, user B has access to the resource, even though neither user is yet connected to the master server. The next time user A connects to the master server, her updated access control table will be synchronized with the master server, and user B subsequently will be able to access the resource from either A's client or from the master server directly.

Now assume computer A is connected to the master server, but computer B is not. User A is away from her computer but wants to grant B access to a resource on computer A. User A can remotely change the access control table on computer A via the master server. For example, if user A users another device (such as a laptop or mobile phone) to log into the master server and change her access control table, the master server will automatically download such change to computer A. Now User B can obtain the resource from computer A.

In one embodiment, data transferred between the peer and requesting device is encrypted to prevent other parties on the network from "sniffing" data as it is transferred. For example, data transferred over a TCP/IP connection may be encrypted via Secure Socket Layer (SSL).

As indicated above, devices advertise resources that they have available for sync to their peers on the local network. As this advertisement may be insecure, devices need only advertise at a course-grained level (e.g., the domains and user whose synchronized data they have available). Advertisement may be done through traditional service discovery mechanisms, such as DNS Service Discovery (dns-sd), or Universal Plug and Play (UPnP) on local area networks (such as a home network), or via directory services including Lightweight Directory Access Protocol (LDAP) on Intranets (often found in corporate networks). When a device needs to synchronize a resource, it will use the chosen discovery mechanism to identify any peers on the local network that advertise the required resource.

The peer-to-peer synchronization is "opportunistic" in that client devices can switch between synchronizing with a peer device and synchronizing with the master server or other device, depending on which is the best method at the time. For instance, consider a scenario where a laptop has established a synchronization session with a peer device on a local network via a wireless connection and then the user of the laptop takes the laptop out of range of the local network. The synchronization session between the laptop and the peer device will be terminated, and the laptop will automatically attempt to establish a synchronization session with the master server. To the user, the synchronization continues seamlessly without interruption. Also, if a client device has established a synchronization session with the master server and then a peer device capable of synchronizing the same data comes online, the client device can switch to synchronizing with the peer device without any action on the part of the user of the client device.

Figure 3A:
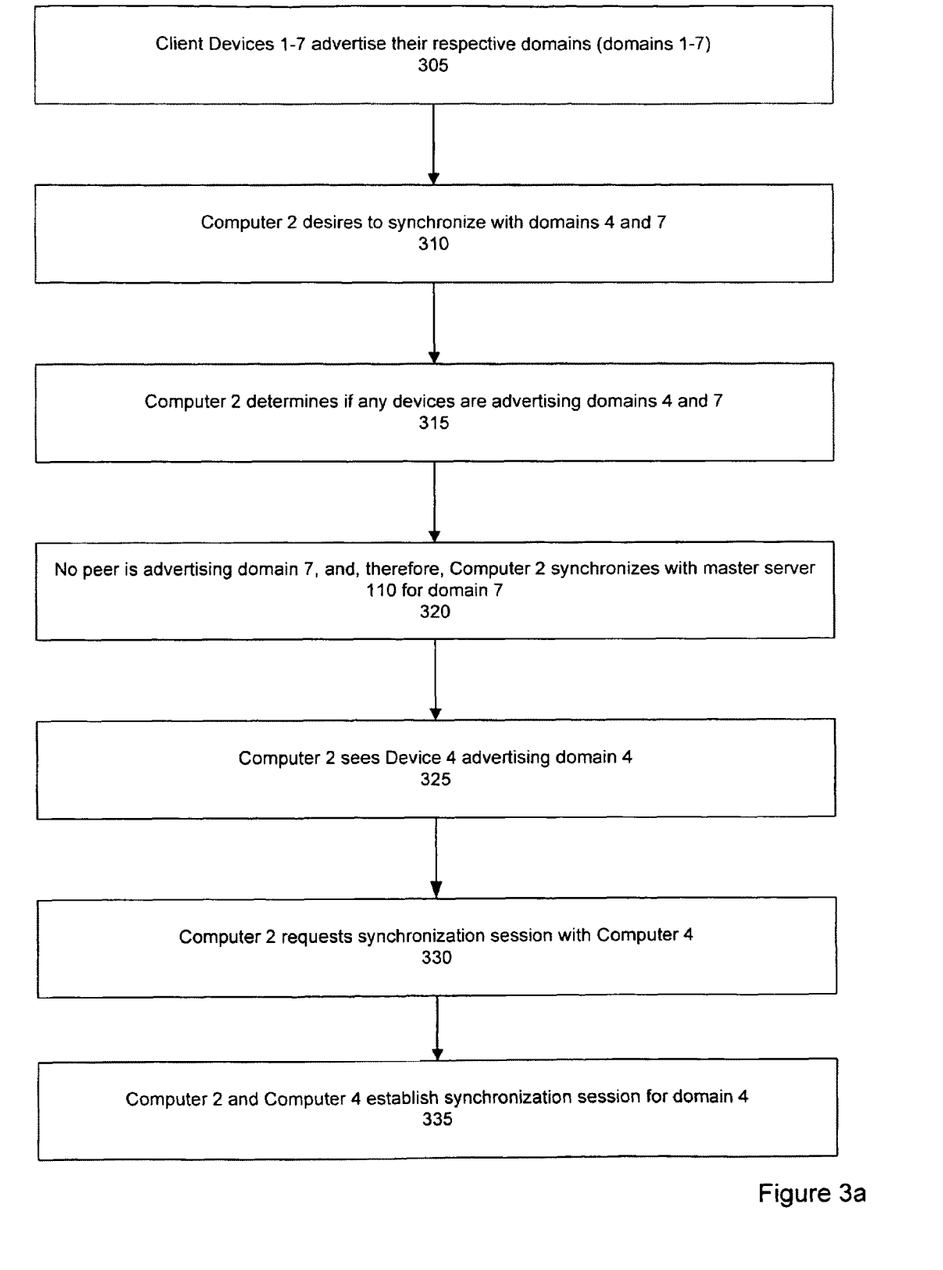
FIGS. 3a-3b illustrate an example of peer-to-peer synchronization according to one embodiment of the present invention.
Figure 3B:
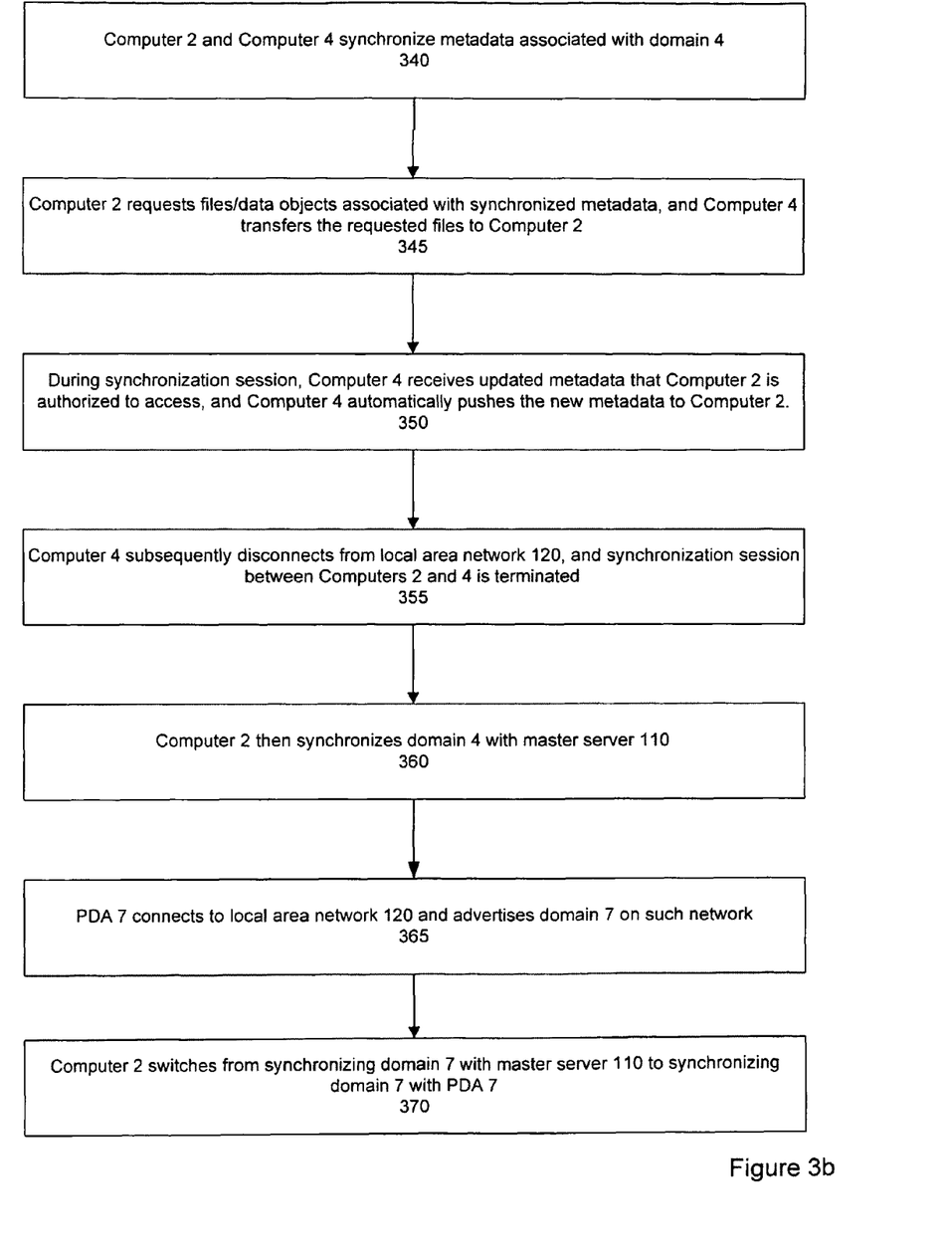

FIG. 3 illustrates an example of opportunistic peer-to-peer synchronization scenario according to the present invention. This example scenario is described with respect to the synchronization system in FIG. 1.

Referring to FIG. 3, Client Devices 1-7 advertise their respective domains (1-7) (305). In this scenario, Computer 2 wants to synchronize with domains 4 and 7 (310). Computer 2 determines if any peer devices are advertising domains 4 and 7 (315). Since PDA 7, which advertises domain 7, is not connected to Computer 2 to via a local area network or intranet, no peer device is advertising domain 7, and therefore Computer 2 synchronizes domain 7 with the master server 110 (320).

Computer 2 sees Computer 4 advertising domain 4 (325). Computer 2 requests a synchronization session with Computer 4 (330), and Computer 2 provides Computer 4 with the user ID or user account of the user associated with Computer 2 ("user 2"). Computer 4 verifies the identity of user 2 and determines if the request is permitted. If user 2's identity is verified and the request is permitted, Computer 2 and Computer 4 establish a synchronization session (335). If the synchronization of data is two-way, then computer 2 verifies the identity of the user associated with computer 4 ("user 4"), and, if computer 2 is able to verify user 4's identity, then computer 2 determines what data (if any) on computer 2 that user 4 is authorized to access.

Computer 2 and Computer 4 synchronize metadata associated with domain 4 (340). During the synchronization session, Computer 2 requests files and/or data objects associated with synchronized metadata from Computer 4, and Computer 4 transfers the requested files to Computer 2 (345). If the synchronization is two-way, Computer 4 may also request and receive files/data objects from Computer 2.

During the synchronization session, Computer 4 receives updated metadata from the master server that Computer 2 is authorized to access, and automatically pushes such metadata to Computer 2 (350).

For some reason, Computer 4 subsequently disconnects from local area network 120 (for example, Computer 4 is turned off, or a user takes Computer 4 out of range of local area network 120), and the synchronization session between Computer 2 and Computer 4 is terminated (355). Computer 2 then automatically synchronizes with domain 4 through master server 110 (360).

PDA 7 then connects with local area network 120 and advertises domain 7. Computer 2 than switches from synchronizing domain 7 with master server 110 and establishes a synchronization session with PDA 7 (370).

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for opportunistic peer-to-peer synchronization in a system having a master synchronization server and a plurality of client computing devices, the method comprising:
monitoring, at a client computing device, synchronization information provided by one or more peer client computing devices to determine whether or not data that the client computing device desires is synchronize is available for synchronization with such one or more peer client computing devices;
if a peer client computing device is available for synchronizing such data, synchronizing such data with the peer client computing device;
if a peer client computing device is not available for synchronizing such data, synchronizing such data with the master synchronization server until a peer client computing device is available for synchronizing such data; and
if a synchronization session with a peer client computing device is interrupted, switching to synchronizing with another peer client device or the master synchronization server in a manner that appears seamless to the user of the client computing device.

2. The method of claim 1, wherein a client computing device can be one of a computer, a mobile phone, a PDA, a set top box, a network appliance, and a network-accessible storage device.

3. The method of claim 1, wherein a peer client computing device can be one of a computer, a mobile phone, a PDA, a set top box, a network appliance, and a network-accessible storage device.

4. The method of claim 1, wherein files and data objects are encrypted before being transferred over the network.

5. The method of claim 1, further comprising:
in response to the peer device requesting, during the synchronization session, a file or data object on the requesting device that is associated with metadata to which the peer device is authorized to access, sending the file/data object from the requesting device to the peer device.

6. A method for synchronizing data between client computing devices, the method comprising:
for each client computing device available for peer-to-peer synchronization, advertising any domains on such client computing device that are available for synchronization, wherein such domains are advertised on a network to which the device is connected;

in response to a client computing device (the "requesting device") desiring to synchronize data from a domain, determining at such client computing device if there is a peer device available for peer-to-peer synchronization that is advertising the desired domain;

in response to no peer device advertising the desired domain, attempting, at the requesting device, to establish a connection with a synchronization server to synchronize data from the desired domain with the server;

in response to identifying a peer device advertising the desired domain (the "peer device"), sending a request from the requesting device to the peer device to establish a synchronization session;

determining at the peer device whether or not the identity of the user associated with the requesting device can be verified;

in response to the peer device being unable verify the user's identity, rejecting the request to establish a synchronization session;

in response to the peer device verifying the user's identity and the validity of the request, establishing a synchronization session between the peer device and the requesting device, wherein, during the synchronization session, the requesting device and the peer device synchronize metadata for the desired domain; and in response to the requesting device requesting, during the synchronization session, a file or data object on the peer device that is associated with metadata to which the requesting device is authorized to access, sending the file/data object from the peer device to the requesting device.

7. The method of claim 6, wherein a client computing device can be one of a computer, a mobile phone, a PDA, a set top box, a network appliance, and a network-accessible storage device.

8. The method of claim 6, wherein a peer client computing device can be one of a computer, a mobile phone, a PDA, a set top box, a network appliance, and a network-accessible storage device.

9. The method of claim 6, wherein a domain can be a user's account.

10. The method of claim 6, wherein a domain can be a user's account on a shared computer.

11. The method of claim 6, wherein during the synchronization session the requesting device and the peer device maintain a dedicated connection.

12. The method of claim 11, wherein the dedicated connection last for as long as the computers are able to communicate with each other over a direct connection on a local network.

13. The method of claim 11, wherein, if during the synchronization session the peer device receives new metadata to which the requesting device can access but has not yet received, such metadata is automatically pushed to the requesting device over the dedicated connection.

14. The method of claim 11, wherein, if during the synchronization session the requesting device receives new metadata to which the peer device can access but has not yet received, such metadata is automatically pushed to the peer device over the dedicated connection.

15. The method of claim 11, wherein if the dedicated connection is broken and the requesting device desires to continue synchronizing the desired domain, the requesting device automatically attempts to establish a connection with the synchronization server to finish synchronizing with the desired domain.

16. The method of claim 6, wherein the network can be a local network, a link local network, or an intranet.

17. The method of claim 16, wherein, on local networks, the advertising is done via DNS Service Discovery.

18. The method of claim 16, wherein, on local networks, the advertising is done via Universal Plug and Play.

19. The method of claim 16, wherein on intranets, the advertising is done via Lightweight Directory Access Protocol.

20. The method of claim 6, wherein, during the synchronization session, the peer device checks an access control table stored on the peer device to identify the metadata that the requesting device is authorized to access.

21. The method of claim 20, wherein access control tables on client computing devices are synchronized with access control tables on the synchronization server when such client devices are online.

22. The method of claim 21, wherein an access control table on a client computing device can be remotely changed from a remote client computing device by:

synchronizing the changes made at the remote client computing device with the synchronization server such that the server has an updated copy of the access control table; and downloading the changes to the client computing device when such client computing device synchronizes with the server.

23. The method of claim 21, wherein the access control table on a client computing device can be changed remotely at the synchronization server via a web interface and wherein the changes made on the server are downloaded to the client computing device when the client computing device is online.

24. A system for opportunistic peer-to-peer synchronization, comprising:

a master synchronization server;

a plurality of client devices that are configured to synchronize data with either a peer client device or the master synchronization server, wherein each client device is configured to:

monitor synchronization information provided by one or more peer client devices to determine whether or not data that the client device desires to synchronize is available for synchronization with a peer client device:

if a peer client device is available for synchronizing such data, synchronize such data with the peer client device;

if no peer client device is available for synchronizing such data, synchronize such data with the master synchronization server until a peer client device is available for synchronizing such data; and switch between synchronizing between a peer device and a master synchronization server is a synchronization session is interrupted.

* * * * *